United States Patent [19]
Dorland et al.

[11] 3,921,934
[45] Nov. 25, 1975

[54] FILM CARTRIDGE

[75] Inventors: E. Everett Dorland; Stephen H. Miller; Archie J. Tucker, all of Rochester, N.Y.

[73] Assignee: Eastman Kodak Company, Rochester, N.Y.

[22] Filed: Mar. 15, 1974

[21] Appl. No.: 451,714

[52] U.S. Cl. ............................. 242/194; 352/156
[51] Int. Cl.² ................... G03B 1/04; G11B 15/32
[58] Field of Search ............... 242/194, 71–71.2; 352/72, 78 R, 156

[56] References Cited
UNITED STATES PATENTS

| | | |
|---|---|---|
| 3,195,826 | 7/1965 | Smith .................................. 242/194 |
| 3,672,603 | 6/1972 | Swain .................................. 242/194 |

*Primary Examiner*—Leonard D. Christian
*Attorney, Agent, or Firm*—K. D. Fosnaught

[57] ABSTRACT

A cartridge for handling an extended length of strip material, such as motion picture film, is adapted to be received in apparatus such as a motion picture camera, or the like. The cartridge includes a pair of spools for, respectively, unwinding and rewinding such film as it passes through the cartridge. To prevent undesired rotation of the spools when the cartridge is not in use, the cartridge includes a lock device disposed to bear against the spools. A lock pin extending exteriorly of the cartridge operates to disengage the lock in response to the cartridge being received into the apparatus.

11 Claims, 13 Drawing Figures

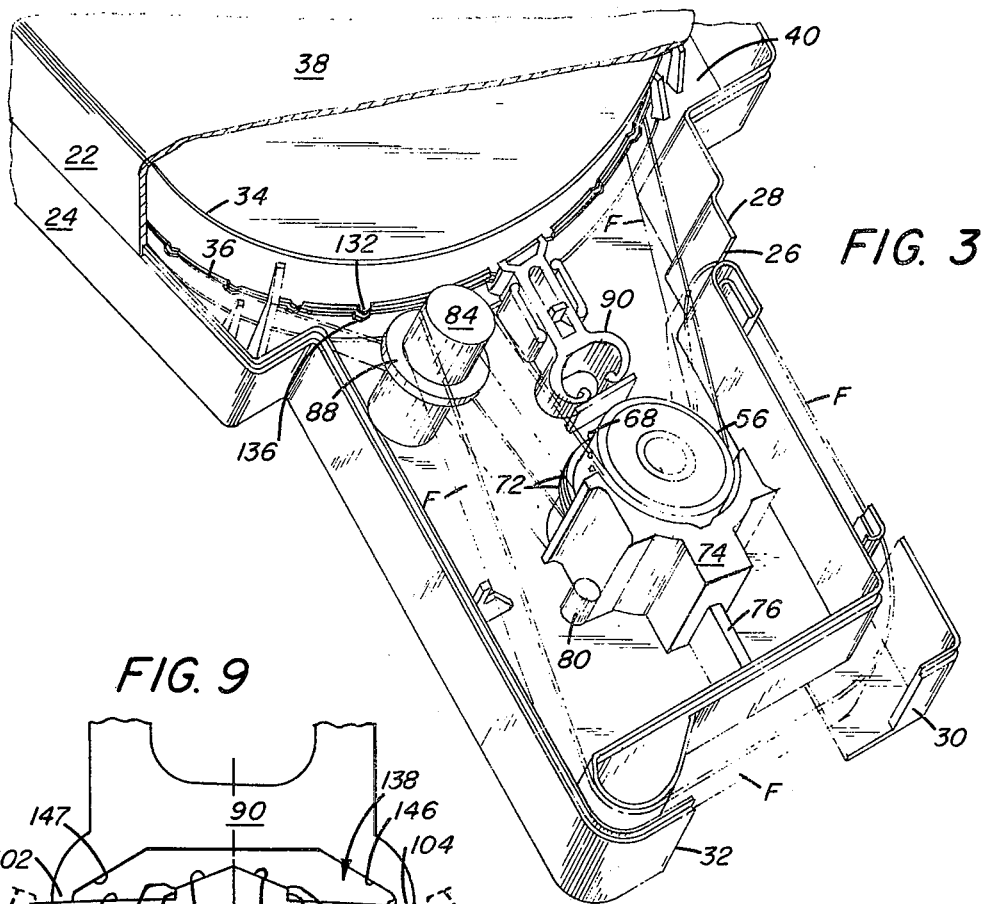
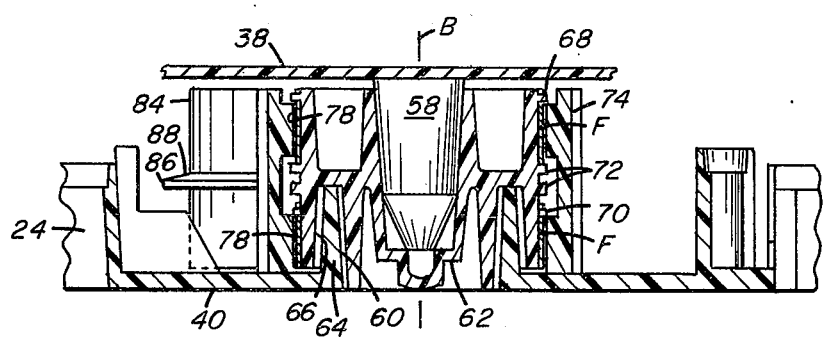

FILM CARTRIDGE

CROSS REFERENCE TO RELATED APPLICATION

Reference is made to commonly assigned copending U.S. Pat. application Ser. No. 461,640, entitled "Film Cartridge and Associated Drive Means" filed on Mar. 15, 1974, in the names of Jasper S. Chandler and Hugh R. McNair.

BACKGROUND OF THE INVENTION

1. Field of the Invention

This invention relates to cartridges or cassettes of a type which is adapted to handle an extended length of strip material and to present such material to apparatus for the recording or reproduction of scene light and/or sound.

2. Description Relative to the Prior Art

Movie film cartridges, such as the type known as "super-8", are adapted to store and guide therethrough a roll of unexposed film and to present such film to a camera for engagement by a drive mechanism, thereby to expose successive frames of the film to scene light. Such cartridges have also been adapted to permit the recording of sound onto a portion of the film strip simultaneously with the recording of scene light.

Film cartridges of the type described above are, however, generally adapted to handle a relatively limited amount of film. A typical "super-8" type cartridge is operable to store and handle a film strip of about 50 feet in length. In most instances, such a cartridge contains ample film for the user's purpose. However, in other instances, such as the filming of a particularly noteworthy event of some length, the momentary interruption resulting from replacing an expended cartridge with a fresh one may prove undesirable.

The previously referenced copending application describes a film cartridge that is adapted to store and handle a film having an extended length, with respect to the prior art cartridges mentioned above, of, say, 200 feet. As described therein, such a cartridge includes a pair of coaxially-mounted spools. One such spool is adapted to store and pay out an extended length of film, while the other is operable to receive and store such film after the film has been advanced through the cartridge and past work stations for the recording or reproduction of images and/or sound.

A difficulty associated with a cartridge of the latter type arises because of the amount of film housed in the cartridge. A wound-up extended length of film imparts, by virtue of its relatively large mass as compared to lesser film lengths, considerable inertia to a spool on which it is wound. Such inertia may result in unwanted spool rotation and film movement if the cartridge is shaken or otherwise abruptly manipulated. When the cartridge is installed in a camera or other cartridge-receiving apparatus, the engagement of the cartridge (as by, for example, the drive mechanism of a camera) will prevent unwanted film movement. However, if the cartridge is subjected to movement when not in the apparatus (as during shipping, for example) the inertia may prove sufficient to cause the film to translate through the cartridge. Such translation may cause wastage of unexposed film. Alternatively, double-exposure of the film may result if the cartridge is removed from a camera after exposure of a portion of the film and subsequently replaced in the camera for continued filming.

In addition, relatively slight rotation of one or both of the spools may cause at least the outermost film convolution to clockspring outward and slip over the outer edge of a flange of the spool on which it is wound. Such "spillage" may result in jamming of the cartridge, thereby rendering it inoperative.

SUMMARY OF THE INVENTION

Releaseably locking the film spools to prevent their rotation has been found to prevent both film translation and film spillage in such a cartridge. Particularly desirable is the use of a movable locking member adapted to engage adjoining flanges of the film reels in combination with an exteriorly protruding actuator pin for releasing the locking member in response to insertion of the cartridge into cartridge-receiving apparatus. It has also been found that an especially efficient locking arrangement is provided by the use of spaced spool protrusions in combination with a bifurcated lock member end. A particular such arrangement provides for both straddling and positive locking, and . . . by the interrelationship of surfaces on the lock member and the teeth . . . encourages positive locking.

BRIEF DESCRIPTION OF THE DRAWINGS

In the detailed description of the preferred embodiments of the invention presented below, reference is made to the accompanying drawings in which:

FIG. 3 is a perspective view of the film cartridge shown in FIG. 1, with a portion of the cartridge broken away;

FIG. 4 is a view along line 4—4 of FIG. 5;

FIGS. 9, 10 and 11 are enlarged top views of a portion of the apparatus shown in FIG. 5;

DESCRIPTION OF THE PREFERRED EMBODIMENT

Photographic apparatus being well known in general, the present description will be directed in particular to elements that form part of, or cooperate more directly with, the present invention. Apparatus that is not specifically shown or described herein is understood to be selectable from apparatus known in the art.

Figure 1:
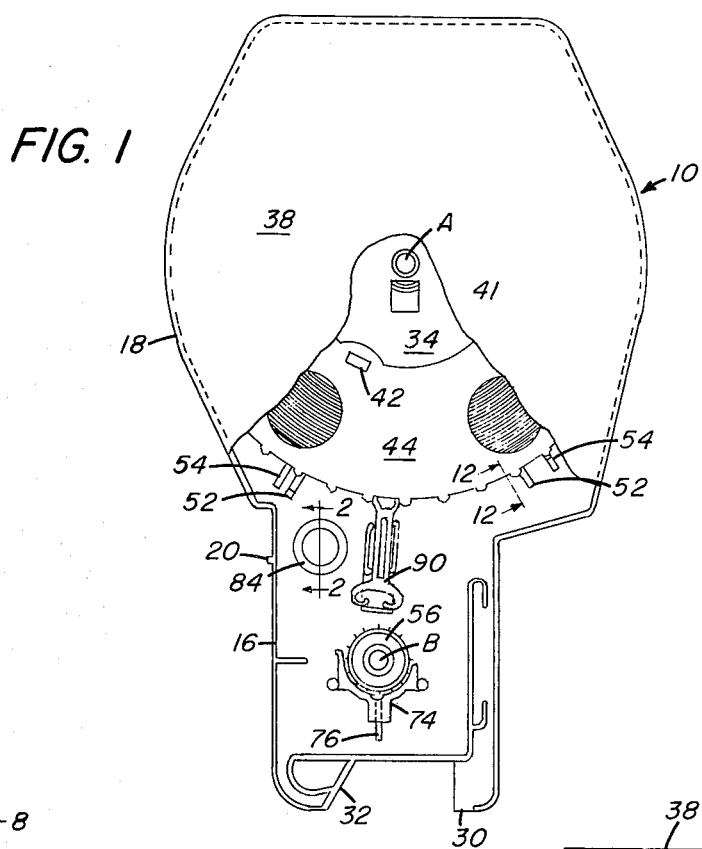
FIG. 1 is a top view of a film cartridge embodying features of the invention, with a portion thereof broken away.

With reference now to the drawings, FIG. 1 depicts a cartridge 10 which incorporates features of the invention. Such cartridge is adapted to handle an extended length of web material such as photographic film. It will be understood, however, that the instant invention may also be used in handling other types of web material, like magnetic recording tape, and, in particular, photographic film carrying a magnetic soundrecording medium, or stripe.

Figure 6:
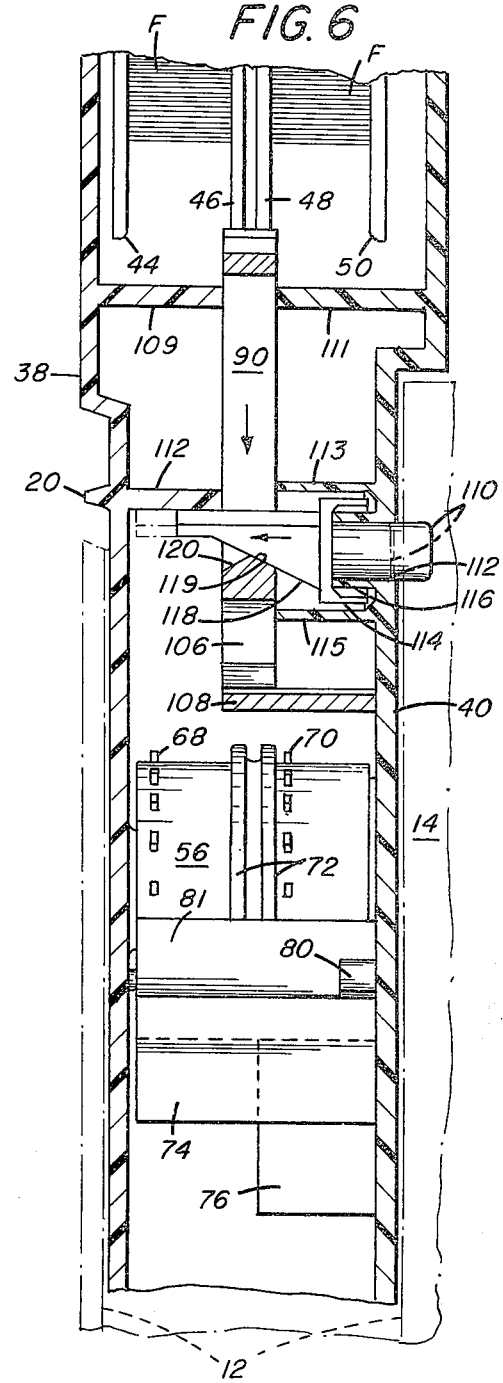
FIG. 6 is a view along line 6—6 of FIG. 5.

Cartridge 10 is adapted to be received within a cartridge-receiving compartment 12 defined by apparatus, such as a camera, of which a portion 14 is shown in FIG. 6. The cartridge 10 has a relatively narrow base portion 16, which is so sized as to be conveniently received in such apparatus, and a relatively expanded portion 18 designed to extend exteriorly of the apparatus. A light lock tongue 20 generally separates the two portions and cooperates with apparatus such as that shown in copending application Ser. No. 336,863 entitled "Door Assembly for a Motion Picture Camera" and filed in the names of H. H. Dudley et al. on Feb. 28, 1973 to shield unexposed film from extraneous light sources.

Figure 13:
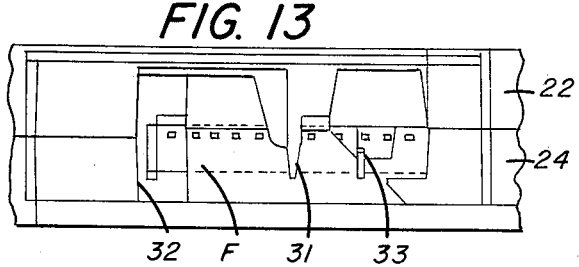
FIG. 13 is an end view of the cartridge shown in FIG. 1.

The cartridge is comprised of a cartridge body 22 and a cartridge cover 24 which are formed (e.g., by molding) of an opaque material and are sealed together to provide a light-tight compartment. An opening 26 is provided in a cartridge edge wall 28 to admit entry of a film-engaging member (not shown), such as a camera claw, for presenting the film F to an exposure aperture in the camera. An edge wall 30 adjacent and generally normal to edge wall 28, defines an opening 32 for admitting into contact with film F devices (not shown) for use in recording sound onto the film. To assist in positioning film F, the cartridge includes (see FIG. 13), in the area of opening 32, a guide finger 31 of the type described in U.S. Pat. No. 3,767,294 issued on Oct. 23, 1973 in the name of Mr. Gerald J. Kosarko. Also, adjacent to finger 31 is located a film end retainer 33 of the type described in U.S. Pat. No. 3,785,726 issued on Jan. 15, 1974 in the name of Mr. Stephen H. Miller and adapted to cooperate with a discontinuity in the film to prevent advancement of the trailing portion of the film past openings 26 and 32.

The cartridge houses, in its expanded portion 18, a pair of relatively rotatable flanged web-winding spools 34 and 36 attached to opposite ends of film F and operable to store and receive or pay out such film. Spools 34 and 36 are suitably mounted for independent rotation with respect to each other and with respect to cartridge 10 about a common axis A which is oriented generally perpendicularly to the opposed top and bottom (as viewed in FIGS. 1 and 3) cartridge side walls 38 and 40. As described more completely in the previously-cited copending application of Jasper S. Chandler et al., spools 34 and 36 are drivingly interconnected by means of a spring motor 41 operable to effect relative rotation of one spool in response to rotation of the other spool, such spools being rotated thereby in a common direction.

Figure 12:
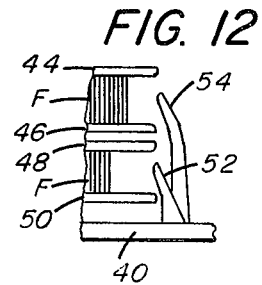
FIG. 12 is a view along line 12—12 of FIG. 1.

Spools 34 and 36 each include a central hub having means, such as attachment device 42, at the outer hub periphery for securing an end of film F thereto for winding about the hub. To accommodate wound film, each spool includes a pair of axially-spaced flanges. Spool 34 thus includes flanges 44 and 46, and spool 36 includes flanges 48 and 50 (see FIG. 6). To assist in retaining wound film within the confines of the spool flanges, pairs of finger-like film retainers 52 and 54 are arranged at the outer flange peripheries as shown in FIG. 1. Such retainers may conveniently be formed integrally with a common cartridge wall, such as wall 40 (see FIG. 12). As shown in FIG. 12, retainers 52 are of a length appropriate to enter between the flanges 48 and 50 of spool 36, while retainers 54 are longer in length so as to enter between the flanges 44 and 46 of spool 34. The retainers 52 and 54 thus tend to restrict the outer film convolutions from clockspringing outward beyond the outer peripheries of the flanges.

The narrow base portion 16 of the cartridge houses apparatus for use in advancing film past openings 26 and 32. As seen in FIGS. 3 and 4, the cartridge includes a filmdrive sprocket 56 which is mounted for rotation about an axis B that is disposed generally parallel to the spool axis A. The sprocket is rotatably mounted on a spindle 58 carried by cartridge side wall 38. The opposite axial end of the sprocket is positioned within a circular opening 60 formed in the opposite side wall 40, whereby the sprocket may be engaged and rotated by a drive member of the cartridge-receiving apparatus (not shown). In the event that the cartridge is to be used with apparatus having a cartridge sensing member of the type described in copending application Ser. No. 438,990 filed on Feb. 4, 1974 in the name of Mr. R. I. Gresens and entitled "Adjustable Drive Mechanism for a Motion Picture Camera", an annular shelf 62 is provided for contact by such sensing member. An annular cup 64 carried by wall 40 and surrounding circular opening 60 forms, in combination with an annular cup-receiving well 66 formed in sprocket 56, a labyrinthine arrangement for restricting the entry of actinic light rays through opening 60. This arrangement may also be used to position temporarily the sprocket 56 in the cartridge during spooling and loading operations when the cartridge body 22 and cover 24 are in an unassembled condition.

Sprocket 56 is adapted to engage film F simultaneously at two axially-spaced locations on the sprocket to assist in transporting such film. Accordingly, sprocket 56 includes two axially-spaced sets of sprocket teeth, designated 68 and 70, for engaging perforations carried by the film F at the respective locations. Sprocket teeth 68 are arranged to engage film F at a level corresponding generally to the axial level of film spool 34, and sprocket teeth 70 are arranged to engage film F at a lower level (as viewed in FIG. 4) generally corresponding to the axial level of film spool 36. Annular film-separation ridges 72 serve to separate the two film levels of the sprocket.

A generally Y-shaped movable film keeper shroud 74 cooperates with sprocket 56 to assure continuous film-sprocket engagement. When the cartridge is in an unassembled condition, keeper shroud 74 may be slid along a guide bar 76 between its normal film-retaining position (see FIG. 3, for example) and a retracted position (shown in phantom in FIG. 5). When in the retracted position, keeper shroud 74 is radially spaced from sprocket 56 to facilitate threading film F around the sprocket during cartridge-loading operations. When in the film-retaining position the inner curved surfaces 78 of the keeper shroud lie in closely-spaced relationship to film F on the sprocket, thereby assuring continuous engagement of sprocket teeth sets 68 and 70 with the film perforations. A pair of locating pins 80 at either side of keeper shroud 74 cooperate with a pair of detent-forming recesses 82 to establish and assist in maintaining such spaced relationship, as during cartridge assembly. The shroud may be slid forward along guide bar 76 from its retracted position (FIG. 5) until pins 80 engage detents 82, thereby at least approximately positioning the shroud with respect to the sprocket. To assure detent engagement, the shroud arms 81 that carry the detents may be so formed as to be biased slightly outward towards pins 80. Precise positioning is established and maintained by a pair of positioning pins (not shown) carried by wall 38 which, when the cartridge body 22 and cover 24 are in an assembled condition, mate with holes 85 in the keeper shroud 74. Desirably, the pins may be cemented or otherwise sealed in such mating engagement to assure permanent precise positioning of the shroud 74 and also to lend structural stability to the cartridge.

As previously indicated, the opposite ends of film F are attached to, respectively, winding spool 34 and winding spool 36, whereby during operation, film F may be unwound from one spool, guided past openings 26 and 32, and rewound on the other spool. As described in the above-mentioned copending application Ser. No. 461,640, the construction of the cartridge 10 is such as to enable transportation of the film F along the path mentioned above either from spool 34 to spool 36, or from spool 36 to spool 34. The direction of travel of film F is thus reversible so as to provide, for example, a fade and lap-dissolve capability in the cartridge.

The film path is perhaps best illustrated in FIG. 3 and may be characterized as including three separate runs and passing between two axial levels within the cartridge. Assuming that film is to be transported from spool 36 to spool 34, a first run extends from the supply spool 36 to the double-toothed sprocket 56 at a first, or lower, level corresponding to the axial level of spool 36. Film in such first run is directed across the lower level of a double-level idler roller 84 which, as seen in FIG. 3 (and FIG. 5), so diverts the film as to increase the amount of wrap, or surface contact, of the film with respect to sprocket 56, thereby facilitating film-driving engagement between teeth 70 and film F.

Figure 2:
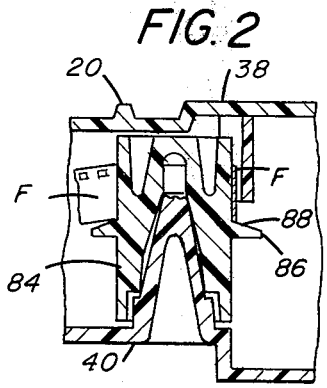
FIG. 2 is an enlarged view along line 2—2 of FIG. 1.

Upon exiting from the sprocket 56, the film F passes along a second run which extends from sprocket 56, past openings 26 and 32, and returns to sprocket 56 for engagement by sprocket teeth 68 at a second, or upper, level corresponding to the axial level of spool 34. Film in such second run climbs, after passing opening 32, from the first, or lower, axial level to the second, or upper, axial level by virtue of its being trained around the upper level of idler roller 84. As shown in FIG. 2, idler roller 84 has an annular film guiding ridge 86 which generally separates the upper and lower roller levels. The upper surface 88 of ridge 86 is conically-shaped so as to guide smoothly film F as it climbs onto roller 84 at the upper roller level, thereby avoiding damage to the film. Upon passing around sprocket 56 at its upper level, film F extends therefrom along a third run which terminates at takeup spool 34.

It has been found that, in a cartridge of the type described above, the high inertia of the wound-up extended length of film F in combination with the driving influence of spring motor 41 can impart rotation to the spools 34 and 36 under certain conditions, thereby causing the film to be undesirably transported through the cartridge when the cartridge is not engaged by its associated apparatus 14. Such transport may result in wastage of unexposed film. If the cartridge is removed after partial exposure in a camera, for example, such movement . . . if it is toward the supply spool . . . may lead to re-exposure of previously exposed film when the cartridge is replaced in the camera for use. In addition, unwanted rotation of either spool may cause the outer convolution or convolutions of film wound thereon to clockspring outward beyond the confines of the spool flanges despite the restraining influence of retainers 52 and 54. Such an escaped loop of film may cause the cartridge to jam so as to prevent its use.

Figure 5:
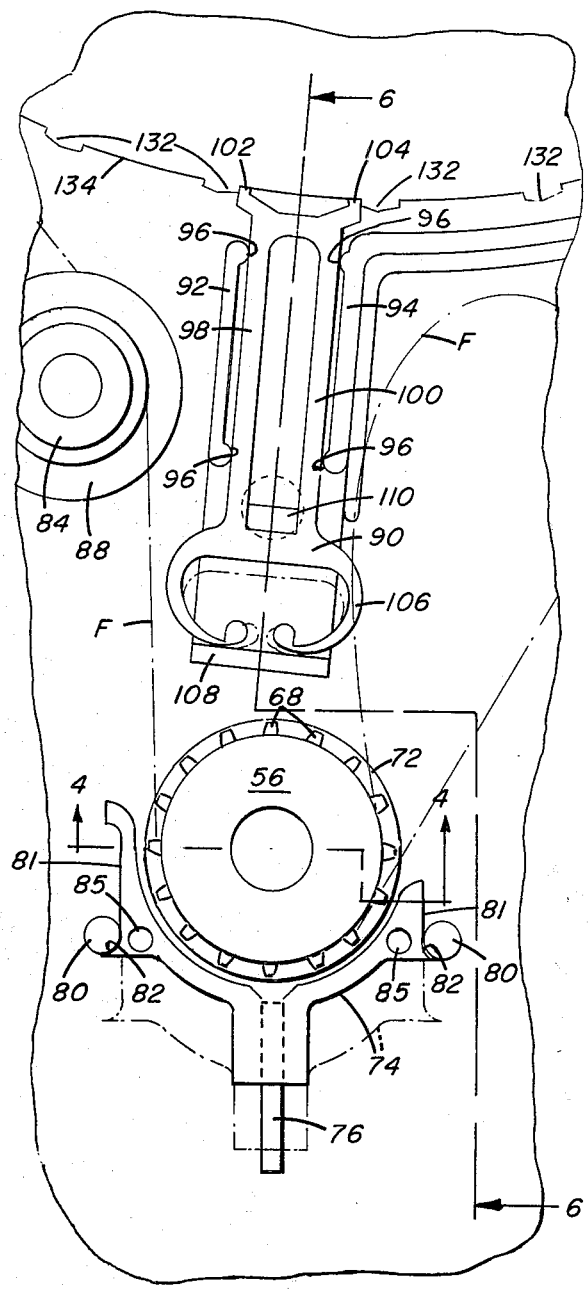
FIG. 5 is a top view of a portion of the cartridge shown in FIGS. 1 and 3.

In accordance with the present invention, a spool lock member 90 is provided to avoid the problems described above. Lock 90 is so disposed as to engage the adjoining flanges 46 and 48 and prevent undesired rotation of the associated spools 34 and 36. As seen in FIG. 5, lock 90 is of elongate form and is mounted for longitudinal sliding movement between a pair of opposed guide walls 92 and 94. For reasons more fully described hereinafter, the lock 90 is located for sliding movement along a radius of spool axis A. Bearing surfaces 96 carried by the walls 92 and 94 at their opposite ends form essentially a line contact with the parallel side rails 98 and 100 of the lock 90, thereby positioning lock 90 with respect to such radius of spool axis A. The use of such line contact-forming bearing surfaces not only reduces friction but also facilitates manufacture of the cartridge, since precise tolerances need be established and maintained only at the bearing surfaces 96 rather than along the full lengths of guide rails 92 and 94.

The end of lock member 90 which is in closest proximity to spools 34 and 36 is bifurcated, as seen in FIG. 5, so as to define two spaced arms which carry, respectively, a pair of spool-engaging teeth 102 and 104. At the opposite end of lock 90, and integrally formed therewith, is a resilient spring 106 comprised of two opposed C-shaped spring leafs. To provide such resiliency, the lock member 90 may advantageously be molded of a material such as polycarbonate or acetal. In order that spring 106 may normally urge lock 90 radially toward spools 34 and 36 and into a position wherein lock teeth 102 and 104 are in engagement with the outer peripheries of flanges 46 and 48 (as shown in FIG. 5), a stationary support wall 108 is provided for bearing against spring 106.

In order that lock member 90 may be advantageously oriented to engage the adjoining flanges 46 and 48 of the winding spools, thereby enabling lock 90 to be of reduced size, supporting walls 109, 111, 112, 113 and 115 are provided (see FIG. 6). Such walls suspend and position lock member 90 generally midway between the opposed cartridge outer walls 38 and 40 and maintain lock 90 in alignment with such flanges.

As previously mentioned, spring 106 normally urges lock member 90 towards spools 34 and 36 and into engagement with the adjoining spool flanges. To retract lock 90 and thereby enable rotation of the spools during operation of the cartridge, an actuating pin 110 disposed for engagement with apparatus 14 operates to retract lock member 90 from its engaged position in response to placement of the cartridge into apparatus 14.

As seen in FIG. 6, actuator 110 comprises an elongate pin mounted for longitudinal reciprocation in a plane generally normal to the plane of reciprocation of lock member 90 and to cartridge side wall 40. In order that it may contact apparatus 14, an end portion of pin 110 extends through an opening 112 in cartridge side wall 40 and protrudes exteriorly of the cartridge. A labyrinthine light lock comprised of a cup-shaped member 114 carried by pin 110 and disposed in telescoped relation with a cup 116 surrounding opening 112 restricts passage of light rays through opening 112. The pin 110 carries, at its opposite end, a camming surface 118 disposed to engage a cooperating cam surface 119 on lock member 90. Such camming surfaces combine to transmit inward movement of pin 110 (produced by contact with apparatus 14) to the lock 90 so as to retract lock 90 from its engaged position, thus freeing spools 34 and 36 for rotation (see arrows in FIG. 6). Lock 90 may also desirably include an alternate cam surface 120 disposed at an angle with respect to the first lock cam surface 119. Such an arrangement renders lock 90 symmetrical (as seen in FIG. 6) and thereby facilitates cartridge assembly operations since the lock 90 may be inserted in the cartridge 10 with either of the cam surfaces 119 or 120 in contact with pin cam surface 118.

Cam surface 118 is, as seen in FIG. 5, disposed on the longitudinal centerline of lock 90 and between parallel side rails 98 and 100. Actuator pin 110 thus is received between such side rails so as to position the pin and locate the loading forces generated by the camming action at the lock member centerline, thereby reducing the liklihood of lock 90 being twisted or otherwise distorted during its use.

Figure 7:
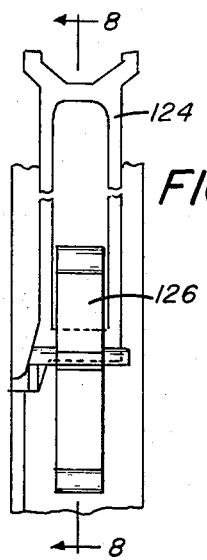
FIG. 7 is a top view of an alternate embodiment of the apparatus shown in FIGS. 5 and 6.
Figure 8:
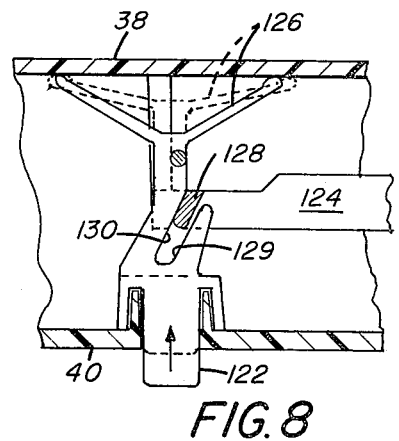
FIG. 8 is a view along line 8—8 of FIG. 7.

FIGS. 7 and 8 depict an alternate embodiment of the locking apparatus shown in FIGS. 5 and 6. Such alternate embodiment includes a protruding reciprocable actuator pin 122 having a light lock arrangement as described above and operable to cammingly engage a lock member 124. In such alternate embodiment the resilient force for urging lock 124 into engagement with the spool flanges is provided by a Y-shaped spring 126 integrally formed at the end of actuator pin 122 and positioned to bear against cartridge wall 38. Accordingly, no spring is provided integral with lock 124. Instead, a slanted cam wall 128 is provided on lock member 124. Such wall 128 is received between a pair of slanted walls which are carried by pin 122 and which define two parallel opposed cam surfaces 129 and 130. In this arrangement, inward movement of pin 122 (see arrow, FIG. 8) produced by contact with apparatus 114 compresses spring 126 and causes cam surface 129 to engage cam wall 128, thereby retracting lock member 124 to permit spool rotation. When pin 122 is released, spring 126 moves pin 122 outward, thereby bringing cam surface 130 into contact with the opposite side of cam wall 128 so as to force the bifurcated end of lock member 124 into engagement with the spool flanges and prevent spool rotation.

The invention described herein further contemplates a particular cooperation between the lock member 90 (or its alternate embodiment) and the engaged spool flanges. In this regard, spool flange 46 includes a plurality of evenly spaced projections 132 arranged at its outer periphery 134. Spool flange 48 includes a plurality of projections 136 identical in form and spacing to projections 132 and similarly disposed along the periphery of flange 48. As seen in FIGS. 9–11, each such projection is oriented on a spool radius R and includes a pair of sides 138 and 138' parallel with such radius. Each projection also defines a face 140 having oppositely sloping surfaces 140' and 140'' which adjoin sides 138' and 138 at shoulders 139 and 139'.

In operation, when the reciprocable lock member is urged forward by its associated spring into spool engagement it may, depending upon the relative positioning of the flange projections 132 and 136 be enabled to enter directly into contact with the flange peripheries 134 (see FIG. 9). If, however, a spool is so oriented as to cause one of the spool engaging teeth 102, 104 to come to rest upon one of the sloping surfaces of a projection face 140, such surface acts as a camming surface to rotate the spool carrying such projection an amount sufficient to permit the lock teeth to enter into contact with the spool periphery. In this regard, it will be noted that the bifurcated flange-engaging end of the lock member defines a recess 138 disposed between teeth 102 and 104. As seen in FIG. 9, such recess is so sized as to admit a flange projection (see FIG. 9) thereinto, whereby such projection is straddled by the bifurcated lock member end to restrict rotation of the associated spool.

As will be apparent from FIG. 9, some slight rotational movement of a straddled projection is possible. More positive locking may be obtained, however, in an arrangement wherein the bifurcated lock member end is lodged between two adjacent projections of a flange (see, for example, FIG. 5 or projections 136 of FIG. 9). In this regard, the width of the bifurcated lock member end, as measured between the outer sides of its teeth 102 and 104, is slightly less than the width of the space between two adjacent projections on a spool as measured between the adjacent radial surfaces 138 of such projections. Accordingly, the lodging of the bifurcated end in the space between ajdacent projections effectively precludes rotation of the associated spool. As previously indicated, lock member 90 is oriented for movement along a radius of spool axis A. Such an arrangement facilitates entry of the lock member between adjacent spool projections and also prevents the forwardly-urged lock member from imparting rotation to an engaged spool.

Although it is possible that the spools may be so rotationally oriented as to permit the bifurcated lock member end to initially enter directly into the space between two adjacent projections of a flange, it is more likely that at least one of the spools will not be so oriented, whereby one of its associated projections will be in the straddled position described above (see FIG. 9). In view of this, the instant invention contemplates a lock member construction which tends to permit movement of a straddled projection into the more positive locking relationship described above and to then retain it in positive locking engagement. In this regard, the recess 138 of the bifurcated lock end is partially defined by a pair of slanted cam surfaces 146 and 147 (see FIG. 9). Such cam surfaces cooperate with shoulders 139, 139' of a straddled projection to assist in forcing lock member 90 towards its retracted position a distance sufficient to permit a straddled projection to move past the bifurcated end of the lock member and into positive locking engagement. In this regard, when the cartridge is subjected to sudden relatively severe movement tending to cause rotation of its spools, rotation of a straddled projection causes an associated projection shoulder (e.g., 139 in FIG. 10) to contact an inner cam surface of the lock member (surface 146 in FIG. 10) and to move along such surface so as to force lock member 90 toward a retracted position (see FIG. 10). A second inner wall 148 is disposed to engage shoulder 139 upon the completion of camming movement of such shoulder along surface 146. As may be seen from FIGS. 9 and 10, and as described more fully hereinafter, wall 148 serves to slow the rotation of the spool carrying shoulder 139, but is nonetheless disposed to form a line contact with such shoulder so as to permit the shoulder to move therealong and to thus force lock member 90 further toward its retracted position. Continued rotation of the spool causes the end of lock member 90 to ride along projection surface 140' as shown in FIG. 11, then along the adjoining surface 140'' until the projection reaches a position outboard of the lock member 90 whereupon the positive locking engagement described above is attained.

It is found that rotation of a straddled projection in the manner described above must be at a controlled rate of movement. Absent such control, it may be possible for rotation to proceed at a rate such as to allow a second, or trailing, projection to be carried into a straddled position before lock member 90 has returned from its slightly retracted position. It is realized that such control could be obtained by simply increasing the spring force that is applied by spring 106 to provide additional resistance to the retracting force exerted on lock 90 by the movement of a straddled projection. However, the force of spring 106 is also applied to lock pin 110 by the interaction of cam surfaces 118 and 119 (or 120) so as to tend to move pin 110 outwardly against apparatus 14. Since it will be apparent that the force exerted on apparatus 14 by pin 110 must be minimized to avoid undue stress on the cartridge and possible unseating of the cartridge from the camera, the use of increased spring force to provide the above-mentioned spool control may prove undesirable. Accordingly, such control force is advantageously supplied by the use of wall 148 in accordance with the present invention.

This invention has been described in detail with a particular reference to a preferred embodiment thereof, but it will be understood that variations and modifications can be effected within the spirit and scope of the invention.

We claim:

1. In a web-handling cartridge for use with apparatus for receiving said cartridge, said cartridge including a wall and first and second flanged web-handling spools coaxially mounted for independent rotation about an axis intersecting said wall, said spools being so arranged that a flange of said first spool adjoins a flange of said second spool, the improvement wherein said cartridge includes:
   (a) an elongate spool locking member mounted for longitudinal movement between a first position wherein a portion of said locking member is operable to engage said flanges simultaneously to restrict rotation of said spools, and a second position relatively remote from said flanges;
   (b) resilient means for urging said locking member toward said first position; and
   (c) actuator means, including a cam surface in engagement with said locking member, for moving said locking member toward said second position in response to said cartridge being received within said apparatus, said actuator means extending through said wall and exteriorly of said cartridge for contacting said apparatus when said cartridge is received therein.

2. The invention of claim 1 wherein said locking member includes a pair of longitudinally extending side rails and wherein the portion of said actuator means that defines said cam surface is disposed between said rails.

3. The invention according to claim 2 wherein said adjoining spool flanges each include a plurality of radially outwardly extending projections evenly spaced at a common interval along the outer peripheries of the respective flanges and wherein said operable portion of said locking member comprises a bifurcated end of said locking member, said bifurcated end having a width slightly less than the width of the space between adjacent ones of said flange projections, whereby said bifurcated end may enter into said space to prevent rotation of a flange.

4. The invention of claim 3 wherein said projections each include beveled face means for rotatively positioning a flange in response to engagement between said operable portion of said locking member and said face means of projection carried by said flange.

5. The invention according to claim 4 wherein said bifurcated end defines a recess having a depth greater than the radial extent of said projections, whereby when said bifurcated end is in engagement with a flange periphery a projection may be received within said recess in straddled relationship with said bifurcated end.

6. The invention of claim 1 wherein said resilient means comprises a spring formed integrally with said locking member and disposed at an end thereof remote from said operable portion of said locking member, and wherein said cartridge includes an abutment surface generally normal to said cartridge wall and so disposed that said resilient member may bear thereagainst to urge said locking member toward said first position.

7. The invention of claim 1 wherein said cartridge includes a second wall generally facing said first wall and wherein said resilient means comprises a spring carried by said movable sensing member means and adapted to bear against said second cartridge wall.

8. The invention of claim 1 wherein said cartridge includes a web driving sprocket rotatable about an axis, said sprocket axis being generally parallel to and spaced radially outward from said spool axis and wherein said spool locking member is disposed between said web driving sprocket and said spools.

9. The invention of claim 8 wherein said spool locking member is mounted for longitudinal movement along a radius of said spool axis.

10. The invention of claim 5 wherein said lock member includes cam means engageable by a straddled projection for displacing said lock member toward said retracted position in response to rotational movement of said straddled projection.

11. A web-handling cartridge for use with apparatus for receiving said cartridge, said cartridge comprising:
   a. a wall;
   b. first and second flanged web handling spools coaxially mounted for independent rotation about an axis intersecting said wall, said spools being so arranged that a flange of said first spool adjoins a flange of said second spool;
   c. a strip of web material in communication with said spools and operable to be transported therebetween in response to spool rotation;
   d. an elongate spool locking member mounted for longitudinal movement between a first position wherein a portion of said locking member is operable to engage said flanges simultaneously to restrict rotation of said spools, and a second position relatively remote from said flanges;
   e. resilient means for urging said locking member toward said first position; and
   f. actuator means for moving said locking member toward said second position in response to said cartridge being received in said apparatus, said actuator means extending through said wall and exteriorly of said cartridge for contacting said apparatus when said cartridge is received therein.

* * * * *